US010139579B2

(12) United States Patent
Lang et al.

(10) Patent No.: US 10,139,579 B2
(45) Date of Patent: Nov. 27, 2018

(54) OPTICAL CABLE FOR TERRESTRIAL NETWORKS

(71) Applicant: PRYSMIAN S.P.A., Milan (IT)

(72) Inventors: Ian Dewi Lang, Milan (IT); Paul John Roberts, Milan (IT); Martin Vincent Davies, Milan (IT); Ralph Sutehall, Milan (IT)

(73) Assignee: PRYSMIAN S.P.A., Milan (IT)

( * ) Notice: Subject to any disclaimer, the term of this patent is extended or adjusted under 35 U.S.C. 154(b) by 0 days.

(21) Appl. No.: 14/906,975

(22) PCT Filed: Jul. 29, 2013

(86) PCT No.: PCT/EP2013/065931
§ 371 (c)(1),
(2) Date: Jan. 22, 2016

(87) PCT Pub. No.: WO2015/014386
PCT Pub. Date: Feb. 5, 2015

(65) Prior Publication Data
US 2016/0202435 A1  Jul. 14, 2016

(51) Int. Cl.
*G02B 6/44* (2006.01)

(52) U.S. Cl.
CPC .......... *G02B 6/443* (2013.01); *G02B 6/4427* (2013.01); *G02B 6/4475* (2013.01); *G02B 6/4495* (2013.01)

(58) Field of Classification Search
CPC .................................................. G02B 6/4495
See application file for complete search history.

(56) References Cited

U.S. PATENT DOCUMENTS 5,970,196 A    10/1999  Greveling et al.
8,582,939 B2 * 11/2013 Gimblet ............... B29C 47/28
                                                    385/100

(Continued)

FOREIGN PATENT DOCUMENTS

EP    1 308 763       5/2003
EP    1 406 104       4/2004
WO    WO 2012/071490  5/2012

OTHER PUBLICATIONS

International Search Report from the European Patent Office for International Application No. PCT/EP2013/065931, dated Apr. 2, 2014.

*Primary Examiner* — Omar R Rojas
(74) *Attorney, Agent, or Firm* — Finnegan, Henderson, Farabow, Garrett & Dunner, L.L.P.

(57) ABSTRACT

An optical cable includes an optical core and an external sheath surrounding the optical core. The external sheath includes a first material having a first, higher fracture toughness and a second material having a second, lower fracture toughness. The first and second materials are arranged so that the second, lower fracture toughness material is accessible from outside the cable along at least one longitudinally extending area of the sheath outer surface. For accessing the optical core of the cable, a short longitudinal cut, namely, few centimeters, is made with a blade in the accessible second, lower fracture toughness material. Then, its cut edges are pulled apart by hand. The pulling force causes the lower fracture toughness material to fracture, thereby propagating the initial short cut longitudinally along the sheath through its whole thickness.

14 Claims, 3 Drawing Sheets

(56) References Cited

U.S. PATENT DOCUMENTS

| | | | |
|---|---|---|---|
| 9,176,293 B2* | 11/2015 | Nave | G02B 6/4432 |
| 2003/0099446 A1 | 5/2003 | Witt et al. | |
| 2004/0062497 A1 | 4/2004 | Plemmons et al. | |
| 2006/0133749 A1* | 6/2006 | Blazer | G02B 6/4404 |
| | | | 385/114 |
| 2012/0063731 A1 | 3/2012 | Fitz et al. | |
| 2012/0134635 A1* | 5/2012 | Davies | G02B 6/4433 |
| | | | 385/113 |
| 2013/0216192 A1 | 8/2013 | Gimblet et al. | |
| 2013/0287346 A1* | 10/2013 | Gimblet | G02B 6/4495 |
| | | | 385/100 |
| 2014/0029902 A1 | 1/2014 | Gimblet et al. | |

\* cited by examiner

OPTICAL CABLE FOR TERRESTRIAL NETWORKS

CROSS REFERENCE TO RELATED APPLICATION

This application is a national phase application based on PCT/EP2013/065931, filed Jul. 29, 2013, the content of which is incorporated herein by reference.

TECHNICAL FIELD

The present invention relates to the field of optical cables. More particularly, the present invention relates to an optical cable for terrestrial networks, in particular—but not exclusively—optical access networks such as FTTH (Fiber To The Home) networks and FTTP (Fiber To The Premises) networks.

BACKGROUND ART

As known, an optical cable typically comprises an optical core including one or more optical fibers and an external sheath enclosing the optical core. The external sheath is typically made of a polymeric material and has the primary function of protecting the optical core from the mechanical point of view.

Within the external sheath, the optical fibers may be arranged in various ways. In particular, in the so-called "loose tube cables", the optical fibers are loosely arranged within one or more buffer tubes. Each buffer tube typically contains multiple fibers, and the individual fibers are free to move relative to one another within the buffer tube. In the so-called "central loose tube cables" (briefly, CLT cables), all the optical fibers of the cable are loosely arranged within a single buffer tube, which is in turn enclosed by the external sheath. In the so-called "multi loose tube cables" (briefly, MLT cables), the optical fibers are instead divided into multiple units (e.g. 3, 4 or 6 units), the optical fibers of each unit being loosely arranged within a respective buffer tube. The buffer tubes are then stranded according to an open helix or S-Z arrangement, typically about a central strength member. A binder may also be provided around the buffer tubes for retaining them. Both in CLT cables and in MTL cables, the external sheath may comprise two side strength members (typically made of steel or fiber reinforced resin) embedded within the sheath's thickness and placed at diametrically opposed positions.

Loose tube cables are typically used for applications where the optical fibers must be individually extracted from the cable and spliced, e.g. in FTTH and FTTP applications. For instance, drop cables of FTTH or FTTP networks are typically implemented as CLT or MLT cables with a particularly reduced diameter (less than 10 mm).

In order to extract one or more optical fibers from a loose tube cable and splice them, a length of the external sheath shall be cut and removed from the cable. To this purpose, special tools with blades suitable for making longitudinal cuts in the cable's sheath are known. During the cutting operations, it is desirable avoiding any accidental impact of the blades against the steel strength members embedded within the sheath's thickness. Such impacts may indeed damage the blades, and damaged blades may injury the operator's hands, especially if she/he does not wear protective gloves.

In order to reduce the risk of these accidental impacts, it is known providing grooves on the outer surface of the sheath, which are typically arranged on a longitudinal plane perpendicular to the longitudinal plane containing the steel strength members. Such grooves aid guiding the blades along a path that does not interfere with the steel strength members. However, when the sheath portion to be cut is rather long (few meters or more), deviations of the blades from the path defined by the grooves become likely.

US 2012/0063731 describes an optical cable including a plurality of tight-buffered optical fiber sub-units stranded in a S-Z configuration. A jacket (consisting of one material only) surrounds the sub-units. The exterior of the jacket includes at least two regions of weakness in the form of two parallel longitudinal grooves, namely regions where the thickness of the jacket is less than in the remainder of the jacket. For accessing the sub-units, the jacket is intentionally buckled in the region between the grooves so as to form a rib. The rib is then cut with a tool or with the user's fingernails. Then, the cut edge of the jacket between the grooves is gripped and longitudinally pulled. The grooves serve as a stress concentrator, allowing the strip of jacket material between the grooves to be split from the rest of the jacket and peeled away. The grooves could also be located up to 180° apart from each other on opposed sides of the cable. In this configuration, the installer could remove the jacket in two halves in a "banana peel" fashion, rather than pulling off a single narrow strip. In order to function effectively as a stress concentrator to produce preferential splitting of the jacket, the grooves would have a depth equal to at least 15% of the jacket thickness.

SUMMARY OF THE INVENTION

The inventors have noticed that the cable of US 2012/0063731 exhibits some drawbacks.

First of all, the grooves basically are thinner sheath areas, which reduce mechanical stability of the sheath for easing its buckling as the cable is bent for the purpose of removing the jacket. However, it is undesirable that the jacket buckles whenever the cable is bent or twisted for purposes other then jacket removal, e.g. for coiling the cable on a drum or laying it down along a narrow curved path (which is very common during installation of FTTH or FTTP networks). Using grooves as disclosed by US 2012/0063731 therefore disadvantageously results in a trade-off between easiness of jacket removal and jacket mechanical performance (in particular, bending and torsion performance).

Besides, in order to relieve such trade-off, one may consider increasing the thickness of the jacket. However, since the external diameter of cables for FTTH or FTTP applications is subject to narrow constraints (because spaces available for installation of cables in such applications are typically very narrow and because the external size of the cables shall be compatible with the size of other components such as connectors, clips, etc.), an increase of the jacket thickness may be achieved only by decreasing the internal diameter of the jacket. This however disadvantageously implies a reduction of the space available for the optical core within the cable, which in turn implies a reduction of the maximum cable fiber count (namely, the maximum number of optical fiber units which may be arranged in the cable).

In view of the above, the Applicant has tackled the problem of providing an optical cable for terrestrial networks (in particular, but not exclusively, FTTH or FTTP networks) whose sheath may be easily removed and, at the same time, is capable of maintaining its mechanical performance even when the cable is bent or twisted, during the whole life of the cable, without requiring any reduction of the cable fibre count.

The Applicant found that the above problem is solved by an optical cable comprising an optical core and an external sheath surrounding the optical core, wherein the sheath is made of two different materials, in particular a first material having a first, higher fracture toughness and a second material having a second, lower fracture toughness (namely, the fracture toughness of the first material is higher than the fracture toughness of the second material). The two materials are arranged so that the second, lower fracture toughness material is accessible from outside the cable along a longitudinally extending area of the sheath outer surface.

As known, the fracture toughness of a material is an indication of the amount of stress required to propagate a pre-existing flaw (e.g. a crack) in the material. As known, a parameter called "stress-intensity factor" (K) is used to determine the fracture toughness. A Roman numeral subscript usually indicates the mode of fracture (three modes different modes of fracture exist). In particular, as known mode I fracture is the condition in which the crack plane is normal to the direction of largest tensile loading, and the mode I fracture toughness is determined by the stress-intensity factor $K_I$ (expressed in Pa $\sqrt{m}$). As also known, the stress-intensity factor $K_I$ of a material in general depends on the material thickness (because the stress states adjacent to the crack changes with the material thickness), until the thickness exceeds a critical dimension. Once the thickness exceeds the critical dimension, the value of $K_I$ becomes substantially constant and this value $K_{IC}$ is a material property independent of the material geometry, which is called "plane-strain fracture toughness" or, briefly, "fracture toughness".

According to the present invention, in the cable sheath the fracture toughness $K_{IC}$ of the first material is higher than the fracture toughness $K_{IC}$ of the second material.

For accessing the optical core of the cable, a short longitudinal cut (namely, few centimeters) is made with a blade in the above mentioned portion of second, lower fracture toughness material. Then, the cut edges of the second, lower fracture toughness material are pulled apart by hand. The pulling force causes the lower fracture toughness material to fracture, thereby propagating the initial short cut longitudinally along the sheath through its whole thickness.

This way, very long portions (namely, several meters) of sheath may be easily removed from the cable with a minimum risk of injuries. The blade is indeed used for making only a very short initial cut, which is then propagated along the cable for the desired length by hand (namely, without the use of any blade) and hence in a very safe way.

Furthermore, using two different sheath materials instead of a geometrical feature of the sheath (namely, grooves) for easing sheath removal is advantageous in that, by suitably choosing the hardness of the two sheath materials, the obtained sheath is thin and, at the same time, mechanically stable and capable of preserving its integrity also when the cable is bent or twisted.

In one aspect, the present invention relates to an optical cable comprising an optical core and an external sheath surrounding the optical core, wherein the external sheath comprises a first material having a first, higher fracture toughness and a second material having a second, lower fracture toughness, wherein the first material and the second material are arranged so that the second, lower fracture toughness material is accessible from outside the cable along at least one longitudinally extending area of an outer surface of the sheath.

Preferably, the second, lower fracture toughness material is accessible from outside the cable along two longitudinally extending areas of the outer surface of the sheath.

Even more preferably, the longitudinally extending areas of the outer surface of the sheath are arranged at diametrically opposed positions.

Preferably, the first material and the second material are arranged so that at least one portion of the second, lower fracture toughness material accessible from outside the cable extends substantially through the whole thickness of the sheath.

According to some embodiments, the at least one portion of the second, lower fracture toughness material has a transversal cross-section in the shape of a sector of annulus.

Preferably, the at least one portion of the second, lower fracture toughness material has an angular width lower than 90°.

Preferably, the sheath has a substantially uniform thickness.

More preferably, the sheath has a thickness comprised between 0.3 mm and 2.1 mm.

Preferably, for a CLT cables the nominal sheath thickness is about 1.9 mm, while for MLT cables is about 0.4 mm.

According to other embodiments, the at least one portion of second, lower fracture toughness material has annular cross-section, the first, higher fracture toughness material is arranged in an outermost position so as to substantially surround the second, lower fracture toughness material, and the sheath comprises at least one groove suitable for making the second, lower fracture toughness material accessible from outside the cable along the longitudinally extending area of the outer surface of the sheath.

Preferably, the sheath comprises two grooves suitable for making the second, lower fracture toughness material accessible from outside the cable along two longitudinally extending areas of the outer surface of the sheath.

According to preferred embodiments, the first material and the second material are selected so that a ratio between the higher fracture toughness $K_{IC}$ of the first material and the lower fracture toughness $K_{IC}$ of the second material is comprised between 1.2 and 7.5.

More preferably, the ratio between the fracture toughness $K_{IC}$ of the first material and the fracture toughness $K_{IC}$ of the second material is comprised between 3.0 and 4.0.

Preferably, the first material and the second material have substantially a same hardness.

Preferably, the first material and the second material comprise a same compound.

Optionally, the first material and the second material have different colours.

In another aspect, the present invention relates to a process for manufacturing an optical cable, the process comprising:
  providing an optical core; and
  forming an external sheath surrounding the optical core, wherein the external sheath comprises a first material having a first, higher fracture toughness and a second material having a second, lower fracture toughness, and wherein the first material and the second material are arranged so that the second, lower fracture toughness material is accessible from outside the cable along at least one longitudinally extending area of an outer surface of the sheath.

BRIEF DESCRIPTION OF THE DRAWINGS

The present invention will become fully clear by reading the following detailed description, to be read by referring to the accompanying drawings, wherein.

DETAILED DESCRIPTION OF PREFERRED EMBODIMENTS OF THE INVENTION

FIGS. 1 to 6 are not in scale.

Figure 1:
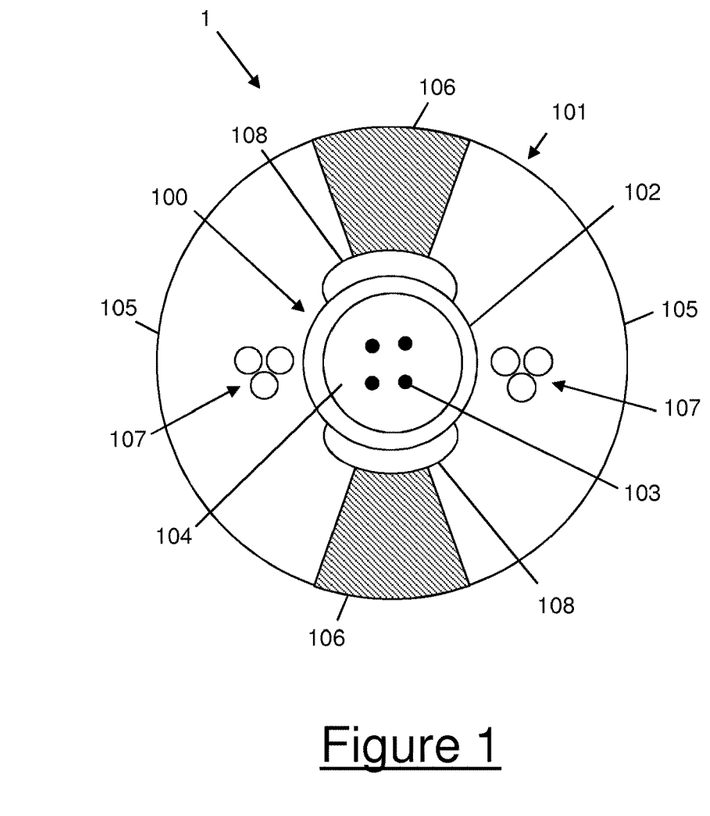
FIG. 1 is a cross-section view of an optical cable according to a first embodiment of the present invention.

FIG. 1 shows an optical cable 1 according to a first embodiment of the present invention. The optical cable 1 according to the first embodiment of the present invention is a drop cable for FTTH or FTTP applications.

The optical cable 1 comprises an optical core 100 and a sheath 101 surrounding the optical core 100.

The optical core 100 comprises a buffer tube 102 and a number of optical fibers 103 loosely arranged within the buffer tube 102. The buffer tube 102 preferably has an outer diameter lower than 4 mm, more preferably lower than 2.5 mm. The buffer tube 102 is preferably made of a thermoplastic polymeric material, for instance PBT (polybutylene terephthalate). The number of optical fibers 103 preferably ranges from 1 to 12. By way of non limiting example, the cable shown in FIG. 1 comprises 4 optical fibers 103. The optical fibers 103 are preferably single mode fibers compliant with ITU-T G652 standard. The interstices between the optical fibers 103 within the buffer tube 102 are preferably filled with a water-blocking material 104, e.g. a thixotropic gel.

The sheath 101 preferably comprises two first longitudinally extending portions 105 made of a first, higher fracture toughness material and two second longitudinally extending portions 106 made of a second, lower fracture toughness material.

Each one of the first portions 105 and second portions 106 has a transversal cross-section in the shape of a sector of annulus.

The angular width of the two first portions 105 is preferably higher than the angular width of the second portions 106. In particular, the angular width of each first portion 105 is preferably higher than 90°, whereas the angular width of each second portion 106 is preferably lower than 90°.

More preferably, the angular width of each first portion 105 is comprised between 110° and 140°, whereas the angular width of each second portion 106 is comprised between 40° and 70°.

The first portions 105 are preferably placed at diametrically opposed positions, and also the second portions 106 are preferably placed at diametrically opposed positions.

All the sheath portions 105, 106 preferably have substantially a same thickness, so that the sheath 101 has a substantially uniform thickness along its perimeter. More preferably, the sheath 101 has a substantially uniform outer diameter along its perimeter. The outer diameter of the sheath 101 is preferably lower than 10 mm, more preferably lower than 8 mm, even more preferably substantially equal to 6 mm.

According to embodiments not shown in the drawings, at least one of the second sheath portions 106 may exhibit an optional groove or notch. Such groove may optionally be provided with an identification stripe and/or ink-jet printed identification codes allowing identification of the cable 1.

Preferably, the first, higher fracture toughness material and the second, lower fracture toughness material are selected so that the ratio between the fracture toughness $K_{IC}$ of the first material and the fracture toughness $K_{IC}$ of the second materials is higher than 1.2. Further, the ratio between the fracture toughness $K_{IC}$ of the first material and the fracture toughness $K_{IC}$ of the second materials is preferably lower than 7.5. According to particularly preferred embodiments, the ratio between the fracture toughness $K_{IC}$ of the first material and the fracture toughness $K_{IC}$ of the second materials is comprised between 3.0 and 4.0. In particular, the first material preferably has a fracture toughness $K_{IC}$ comprised between 0.9 and 2.8 MPa $\sqrt{m}$, whereas the second material has a fracture toughness $K_{IC}$ comprised between 0.4 and 0.7 MPa $\sqrt{m}$.

The first and second materials are preferably compatible from the mechanical point of view, in particular they exhibit substantially the same hardness and properties of reciprocal adhesion. In particular, the first and second materials are preferably different mixtures comprising a same compound, e.g. polyethylene. In addition to such compound, first material comprises a further compound increasing its fracture resistance, e.g. polypropylene. This provides a strong and continuous bond between all the sectors 105 and 106, thereby providing the sheath 101 with mechanical stability and improving its mechanical protection performance.

Preferably, the first and second materials have different colors, in order to allow visual identification of the second portions 106 from outside the cable. Optionally, at least one of the first material and the second material may be a transparent or translucent material, which allows the inner structure of the cable 1 to be partially visible from outside the cable 1.

The Applicant made positive tests using, as first material, a mixture of PEHD (polyethylene high-density) and PP (polypropylene) and, as second material, PELD (polyethylene low-density). More particularly, a positive test has been made using, as first material, a mixture of 20% PEHD (Borealis 6063), 78% PP (Repsol Isplen® PB 140 G2M) and 2% black colorant and, as second material, a mixture of 98% PELD (Borealis 8706) and 2% green colorant.

The sheath 101 is preferably extruded by a dual extrusion equipment comprising two extruders (one for each material of the sheath) feeding into a single cross head from different inlet points. A cartridge is fitted into the cross head, which splits the flow of first material provided by one of the two extruders, so as to form a circumferentially closed tube of first material that surrounds the optical core 100. The second material provided by the other extruder is instead fed to a plate arranged in front of the cross head, which is configured to divide the flow of second material into two half-flows and increase their pressure so as to allow them to penetrate through the thickness of the first material, thereby forming the second portions 106 of the sheath 101.

The cable 1 also preferably comprises two strength members 107 arranged within the thickness of the sheath 101.

The two strength members 107 are arranged at diametrically opposed positions, embedded within the thickness of the first sheath portions 105.

Preferably, each strength member 107 comprises a number of (three, in the embodiment of FIG. 1) metallic strands, e.g. coated steel strands.

The strength members 107 are preferably arranged on a longitudinal plane perpendicular to the longitudinal plane containing the bisector of the second sheath portions 106.

The cable 1 also comprises two optional ripcords 108 arranged between the optical core 100 and the second sheath portions 106 made of the second, lower fracture toughness material. Each ripcord 108 is preferably made of non-metallic yarns, e.g. aramid yarns or polyester yarns. The ripcords 108 advantageously contribute to protect the core 100 from the mechanical point of view.

In order to remove a portion of few meters of the sheath 101 from the cable 1 for accessing the optical fibers 103 comprised therein, firstly the two second sheath portions 106 made of lower fracture toughness material are identified, e.g. based on their color (which, as mentioned above, is preferably different from the color of the sheath first portions 105) and/or their grooves or notched (if present) and/or their identification stripes or codes (if present).

Then, two short longitudinal cuts (namely, cuts of few centimeters) are preferably made at diametrically opposed positions, in the second portions 106 of the sheath 101, close to a free end of the cable 1. Such cuts may be made one-by-one by means of a cutter provided with a single blade. Alternatively, the cuts may be made by means of a tool having two opposite blades which perform both cuts at a same time.

The cuts preferably cross the sheath 101 through its entire thickness. The ripcords 108 protect the optical core 100 from damages due to accidental impacts of the blade(s) against the buffer tube 102. The cuts divide the sheath 101 into two substantially identical halves (or half-sheaths), each half-sheath including one of the first sheath portions 105 made of higher fracture toughness material.

Then, the operator may grip the two half-sheaths with her/his hands and pull them apart. In this case, the cut edges of the second sheath portions 106 are pulled apart. The pulling force causes the second sheath portions 106 to fracture, thereby propagating the initial short cuts longitudinally along the sheath 101 through its whole thickness. The half-sheaths may be pulled until the cuts in the sheath 101 have propagated for the desired length, e.g. some meters. The cable sheath 101 is therefore removed from the cable 1 in a "banana peel" fashion.

A portion of optical core 100 having substantially the same length as the length of the removed sheath is accordingly exposed. The operator may then remove the buffer tube 102 of the optical core 100 with a suitable cutter, thereby exposing the optical fibers 103 comprised therein. The operator may then carry out splicing and other installation operations on the optical fibers 103.

Therefore, advantageously, the sheath 101 of the optical cable 1 may be removed in a very easy and very safe way. Blades are indeed needed only to perform the initial cuts in the sheath 101, which are very short and which accordingly may be made with a minimal injury risk for the operator. The presence of longitudinal lower fracture resistance portions in the cable sheath then allows longitudinally propagating the cuts along the sheath by simply pulling apart the two halves of the sheath, without the need to use any potentially hazardous tool with blades. Also this latter operation is accordingly very safe.

Furthermore, advantageously, there is no need to provide grooves on the outer surface of the sheath 101 for indicating the preferred cut positions. Indeed, the areas where the first cuts can be made in a safe way may be easily identified by the operator based on their colour, since (as mentioned above) at such areas the colour of the sheath is different than in the remainder of the sheath.

Furthermore, in the cable 1 grooves are not need for propagating the cuts along the sheath, since according to the present invention the cut propagation effect is achieved by using two different materials with different fracture toughness in the sheath. The absence of grooves on the outer surface of the sheath is advantageous in that, as discussed above, grooves basically are thinner sheath areas which reduce mechanical stability and resistance of the sheath.

Therefore, according to the present invention, by using two different materials instead of a geometrical feature (namely, grooves) of a sheath consisting of one material only for easing sheath removal, it is possible to have a very thin sheath which, at the same time, is mechanically stable and capable of preserving its integrity also when the cable is bent or twisted. The reduction of the sheath thickness ultimately results, as explained above, in an increased space available for accommodating the cable core and, therefore, in an increased fibre count. For example, reducing the sheath thickness in drop cables, the core diameter can grow from 2.2 mm to 3.4 mm so an increase of optical fiber units from 24 to 48 is made.

Figure 2:
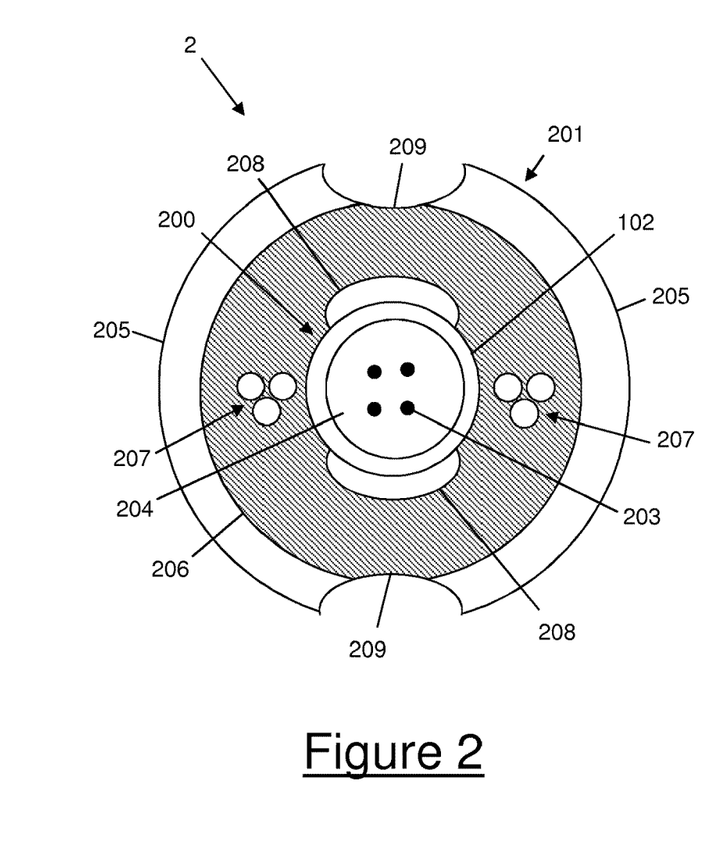
FIG. 2 is a cross-section view of an optical cable according to a second embodiment of the present invention.

FIG. 2 shows an optical cable 2 according to a second embodiment of the present invention.

The optical cable 2 according to the second embodiment of the present invention is a drop cable for FTTH or FTTP applications.

The optical cable 2 comprises an optical core 200 and a sheath 201 surrounding the optical core 200.

The optical core 200 comprises a buffer tube 202 and a number of optical fibers 203. The features of the optical core 200 and its components are similar to that of the optical core 100 shown in FIG. 1. Therefore, a detailed description will not be repeated.

According to the second embodiment, the sheath 201 comprises a first longitudinally extending portion 205 made of a first, higher fracture toughness material and a second longitudinally extending portion 206 made of a second, lower fracture toughness material.

The first portion 205 and the second portion 206 have annular, concentric cross-sections.

The first portion 205 is arranged in an outermost position with respect to the second portion 206 so as to surround the second portion 206.

The sheath 201 preferably comprises two grooves (or notches) 209 placed at substantially diametrically opposed positions in the first portion 205.

The grooves 209 have a depth equal to or higher than the thickness of the first annular portion 205. This way, the first annular portion 205 is divided into two half-portions and the second annular portion 206 is accessible from outside the cable 2 between the two half-portions 205. In other words, each groove 209 basically is a pass-through opening allowing access to the second portion 206 from outside the cable 2. The shape and size of the grooves 209 are accordingly selected so as to optimize accessibility of the second portion 206 from outside the cable 2, without affecting the mechanical stability of the sheath 201. In particular, the grooves 209 preferably have a blunt profile. Furthermore, the groove depth is preferably lower than 1 mm, more preferably lower than 0.8 mm, even more preferably substantially equal to 0.6 mm. This way, even when the cable 2 is bent or twisted e.g. during installation, the presence of the grooves 209 does not impair the sheath integrity.

At least one of the grooves 209 is optionally provided with an identification stripe and/or ink-jet printed identification codes allowing identification of the cable 2.

The features of the first, higher fracture toughness material and second, lower fracture toughness material are preferably the same as discussed above with reference to the first embodiment. Therefore, a detailed description will not be repeated. The sheath 201 is preferably extruded by an extrusion equipment comprising an extrusion die modified with a double groove allowing co-extrusion of both the annular portions 205, 206 of the sheath 201.

The cable 2 also preferably comprises two strength members 207 arranged within the thickness of the sheath 201. In particular, the two strength members 207 are arranged at diametrically opposed positions, embedded within the thickness of the second annular portion 206. Preferably, each strength member 207 comprises a number of (three, in the embodiment of FIG. 2) metallic strands, e.g. coated steel strands. The strength members 207 are preferably arranged on a longitudinal plane perpendicular to the longitudinal plane containing the bisector of the grooves 209.

The cable 2 also comprises two optional ripcords 208 arranged between the optical core 200 and the second sheath portion 206 made of the second, lower fracture toughness material. The ripcords 208 are preferably aligned with the grooves 209. Each ripcord 208 is preferably made of non-metallic yarns, e.g. aramid yarns or polyester yarns.

In order to remove a portion of few meters of the sheath 201 from the cable 2 for accessing the optical fibers 203 comprised therein, firstly the two grooves 209 are preferably identified. Their identification is eased by the fact that, as discussed above with reference to the first embodiment, also in this second embodiment the materials of the first annular portion 205 and second annular portion 206 (which is visible from outside the cable through the grooves 209) have different colors.

Then, two short longitudinal cuts (namely, cuts of few centimeters) are preferably made at diametrically opposed positions, in the second portion 206 of the sheath 201 (namely, where the second portion 206 is accessible from outside the cable through the grooves 209), close to a free end of the cable 2. Such cuts may be made one-by-one by means of a cutter provided with a single blade. Alternatively, the cuts may be made by means of a tool having two opposite blades which perform both cuts at a same time. The cuts preferably cross the sheath 201 through its entire thickness. The ripcords 208 protect the optical core 200 from damages due to accidental impacts of the blade(s) against the buffer tube 202. The cuts divide the sheath 201 into two substantially identical halves (or half-sheaths), each half-sheath including one of the half-portions 205 made of higher fracture toughness material.

Then, the operator may grip the two half-sheaths with her/his hands and pull them apart. In this case, the cut edges of the second sheath portion 206 are pulled apart. The pulling force causes the second sheath portion 206 to fracture, thereby propagating the initial short cuts longitudinally along the sheath 201 through its whole thickness. The half-sheaths may be pulled until the cuts in the sheath 201 have propagated for the desired length, e.g. some meters. The cable sheath 201 is therefore removed from the cable 2 in a "banana peel" fashion.

A portion of optical core 200 having substantially the same length as the length of removed sheath is accordingly exposed. The operator may then remove the buffer tube 202 of the optical core 200 with a suitable cutter, thereby exposing the optical fibers 203 comprised therein. The operator may then carry out splicing and other installation operations on the optical fibers 203.

Therefore, advantageously, also according to the second embodiment the sheath 201 of the optical cable 2 may be removed in a very easy and very safe way. Blades are indeed needed only to perform the initial cuts in the sheath 201, which are very short and which accordingly may be made with a minimal injury risk for the operator. The presence of longitudinal lower fracture resistance portions in the cable sheath then allows longitudinally propagating the cuts along the sheath by simply pulling apart the two halves of the sheath, without the need to use any potentially hazardous tool with blades. Also this latter operation is accordingly very safe.

Therefore, according to the present invention, by using two different sheath materials—instead of stress concentrators in the form of grooves in a sheath consisting of one material only—the strength, abrasion resistance and torsion properties of the cable are advantageously maintained and do not change during the whole life of the cable itself. Furthermore, in spite of the presence of two different materials within the sheath 201, the cable 2 according to the second embodiment has an increased resistance to bending, its sheath 201 being very stable from the mechanical point of view also when the cable is bent. Furthermore, the sheath 201 advantageously exhibits a particularly reduced risk of splitting at the joints, due to the concentric arrangement of the two materials.

Figure 3:
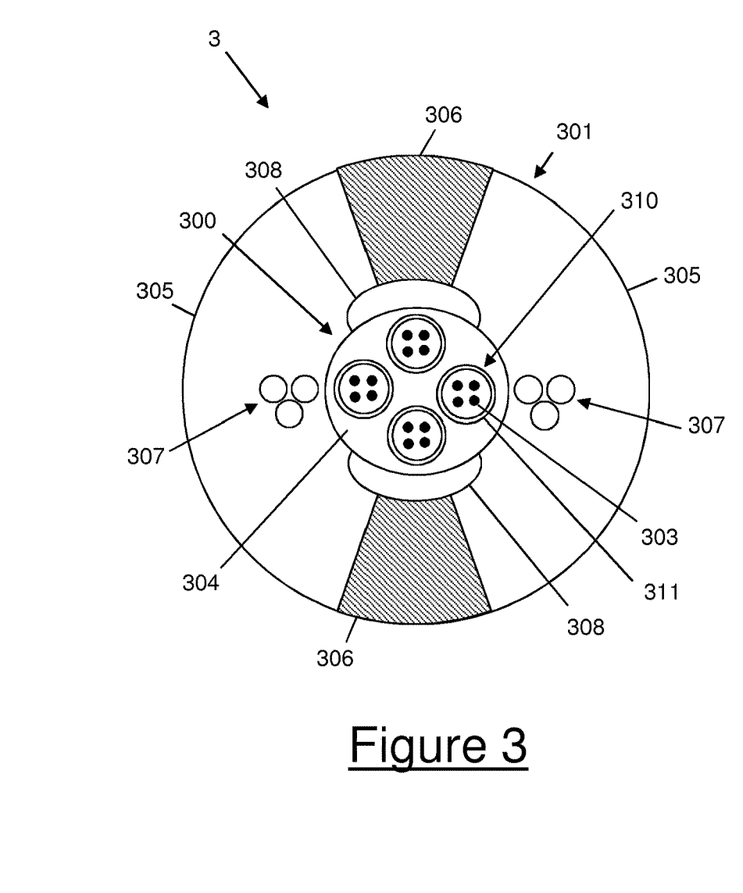
FIG. 3 is a cross-section view of an optical cable according to a third embodiment of the present invention.

FIG. 3 shows an optical cable 3 according to a third embodiment of the present invention. The optical cable 3 according to the third embodiment of the present invention is a drop cable for FTTH or FTTP applications.

The optical cable 3 comprises an optical core 300 and a sheath 301 surrounding the optical core 300.

The optical core 300 comprises a number of optical units 310, each optical unit 310 comprising a number of optical fibers 303. For the purposes of the present description and claims, an optical unit is intended to be an assembly comprising one or more optical fiber(s) (each optical fiber being constituted by a glass core, a glass cladding, a single or dual coating layer) and an outer layer (e.g. a retaining element or a buffer tube) surrounding said one or more optical fiber(s) in order to retain the optical fiber(s) and/or protect them from damage.

The number of optical units 310 comprised in the optical core 300 preferably ranges from 2 to 4. The number of optical fibers 303 for each unit 310 preferably ranges from 2 to 12. The fiber count of the cable 3 accordingly ranges from 4 to 48 optical fibers 303. By way of non limiting example, in the cable shown in FIG. 3 the optical core 300 comprises 4 units 310 and each unit 310 comprises 4 optical fibers 303, the fiber count being equal to 16. The optical fibers 303 are preferably single mode fibers compliant with ITU-T G652 standard. Each optical unit 310 also preferably comprises a retaining element 311 for retaining the fibers 303 of each unit 310. The interstices between the optical fiber units 310 are preferably filled with a water-blocking material 304, e.g. a thixotropic gel. Optionally, a buffer tube (not shown in the drawings) may surround all the optical fiber units 310.

The sheath 301 preferably has a structure similar to that of cable 1 shown in FIG. 1, namely: it comprises two diametrically opposed first longitudinally extending portions 305 made of a first, higher fracture toughness material and two diametrically opposed second longitudinally extending portions 306 made of a second, lower fracture toughness material, each one of the first portions 305 and second portions 306 having a transversal cross-section in the shape of a sector of annulus. The geometrical features of the first and second portions 305, 306, as well as the features of the first and second materials, are the same as described above with reference to the first embodiment. Hence, a detailed description will not be repeated.

The cable 3 also preferably comprises two strength members 307 arranged within the thickness of the sheath 301. In particular, the two strength members 307 are arranged at diametrically opposed positions, embedded within the thickness of the first sheath portions 305. Preferably, each strength member 307 comprises a number of (three, in the embodiment of FIG. 3) metallic strands, e.g. coated steel strands. The strength members 307 are preferably arranged on a longitudinal plane perpendicular to the longitudinal plane containing the bisector of the second sheath portions 306.

The cable 3 also comprises two optional ripcords 308 between the optical core 300 and the second sheath portions 306 made of the second, lower fracture toughness material. Each ripcord 308 is preferably made of non-metallic yarns, e.g. aramid yarns or polyester yarns.

Removal of the sheath 3 from the cable 3 is similar to the removal operation of the sheath 101 from the cable 1 shown in FIG. 1 as described above. Therefore, a detailed description will not be repeated.

Upon removal of a length of the sheath 301 in a "banana peel fashion" as described above, a portion of optical core 300 having substantially the same length as the length of removed sheath is exposed. Since no buffer tube is preferably comprised in the optical core 300, the optical units 310 are directly exposed. The operator may then peel one or more units 310 by removing its retaining element 311 (either by hand or by a tool), thereby exposing the optical fibers 303 comprised therein. The operator may then carry out splicing and other installation operations on the optical fibers 303.

Figure 4:
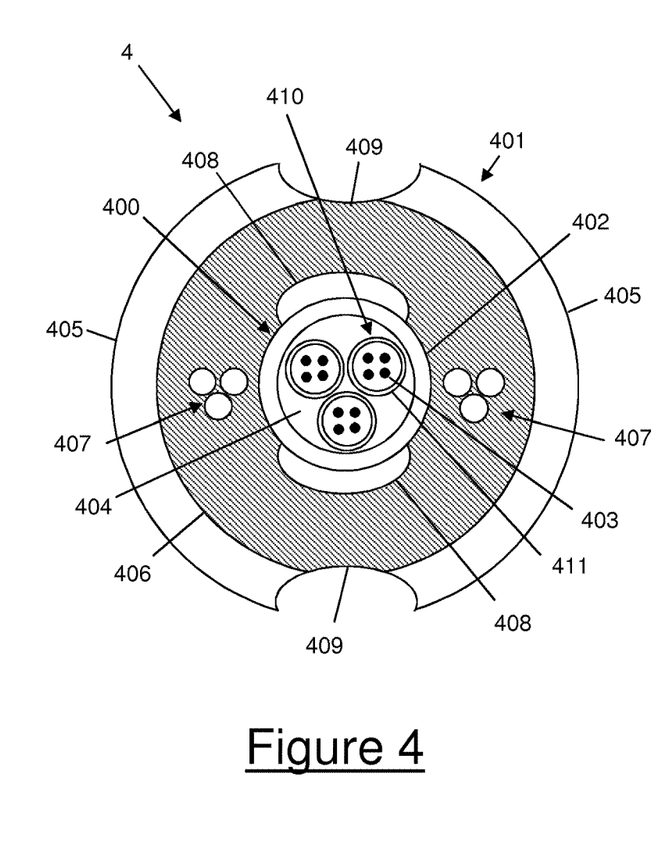
FIG. 4 is a cross-section view of an optical cable according to a fourth embodiment of the present invention.

This third embodiment then exhibits the same advantages as the first one, namely: the sheath may be removed in a very easy and very safe way and no grooves are needed on the external surface of the sheath for sheath removal purposes, so that the sheath is thin and mechanically stable at the same time. FIG. 4 shows an optical cable 4 according to a fourth embodiment of the present invention. The optical cable 4 according to the fourth embodiment of the present invention is a drop cable for FTTH or FTTP applications.

The optical cable 4 comprises an optical core 400 and a sheath 401 surrounding the optical core 400.

The optical core 400 comprises a buffer tube 402 and a number of optical units 410 loosely arranged within the buffer tube 402. Each optical unit 410 comprises a number of optical fibers 403. The buffer tube 402 is preferably made of a thermoplastic polymeric material, for instance PBT (polybutylene terephthalate)OK. The number of optical units 410 comprised in the optical core 400 preferably ranges from 2 to 4. The number of optical fibers 403 for each unit 410 preferably ranges from 2 to 12. The fiber count of the cable 4 accordingly ranges from 4 to 48 optical fibers 403.

By way of non limiting example, in the cable shown in FIG. 4 the optical core 400 comprises 3 units 410 and each unit 410 comprises 4 optical fibers 403, the fiber count being equal to 12. The optical fibers 403 are preferably single mode fibers compliant with ITU-T G652 standard. Each optical unit 410 preferably comprises a retaining element 411 for retaining the fibers of each unit 410. The interstices between the optical units 410 are preferably filled with a water-blocking material 404, e.g. a thixotropic gel. According to a variant not shown in the drawings, the optical core 400 comprises no buffer tube 402.

The sheath 401 preferably has a structure similar to that of cable 2 shown in FIG. 2, namely it comprises a first longitudinally extending portion 405 made of a first, higher fracture toughness material and a second longitudinally extending portion 406 made of a second, lower fracture toughness material, the first portion 405 and the second portion 406 being concentric, the first portion 405 being in an outermost position and comprising two substantially diametrically opposed grooves 409 which divide it into two half-portions and make the second portion 406 accessible from outside the cable 4 along two longitudinal areas included between the two half-portions 405.

The geometrical features of the first and second portions 405, 406 and the grooves 409, as well as the features of the first and second materials, are the same as described above with reference to the second embodiment. Hence, a detailed description will not be repeated.

The cable 4 also preferably comprises two strength members 407 arranged within the thickness of the sheath 401.

In particular, the two strength members 407 are arranged at diametrically opposed positions, embedded within the thickness of the second portion 406. Preferably, each strength member 407 comprises a number of (three, in the embodiment of FIG. 4) metallic strands, e.g. coated steel strands. The strength members 407 are preferably arranged on a longitudinal plane perpendicular to the longitudinal plane containing the bisector of the grooves 409.

The cable 4 also comprises two optional ripcords 408 arranged between the optical core 400 and the second sheath portion 406 made of the second, lower fracture toughness material. The ripcords 408 are preferably aligned with the grooves 409. Each ripcord 408 is preferably made of non-metallic yarns, e.g. aramid yarns or polyester yarns.

Removal of the sheath 4 from the cable 4 is similar to the removal operation of the sheath 201 from the cable 2 shown in FIG. 2 as described above. Therefore, a detailed description will not be repeated.

Upon removal of a length of the sheath 401 in a "banana peel fashion" as described above, a portion of optical core 400 having substantially the same length as the length of removed sheath is exposed. The operator may then remove the buffer tube 402 of the optical core 400 with a suitable cutter, thereby exposing the optical fiber units 410 comprised therein. The operator may then peel one or more fiber units 410 by removing its retaining element 411 (either by hand or by a tool), thereby exposing the optical fibers 403 comprised therein. The operator may then carry out splicing and other installation operations on the optical fibers 403.

This fourth embodiment then exhibits the same advantages as the second one: the sheath may be removed in a very easy and very safe way, and the cable sheath exhibits a particularly high resistance to bending and a particularly reduced risk of splitting at the joints.

The sheath structure depicted in FIGS. 1 and 3, as well as the sheath structure depicted in FIGS. 2 and 4, may be applied not only to drop cables, but also to other types of terrestrial optical cables, independently of the construction of their optical core.

Figure 5:
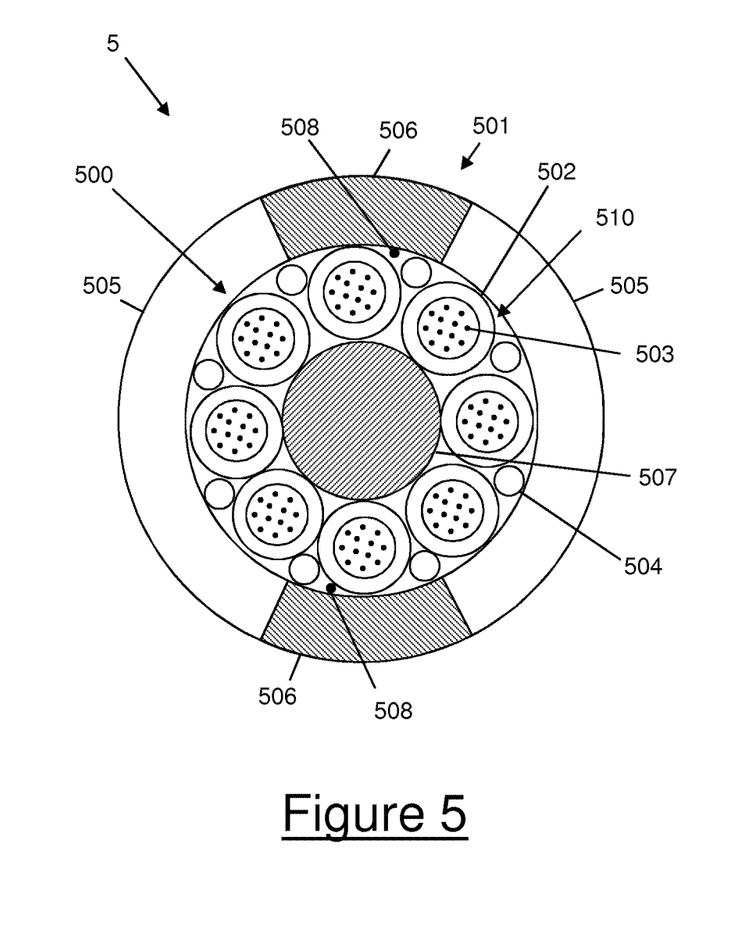
FIG. 5 is a cross-section view of an optical cable according to a fifth embodiment of the present invention.

For instance, FIG. 5 shows an optical cable 5 according to a fifth embodiment of the present invention. The optical cable 5 according to the fifth embodiment of the present invention is a multi-loose tube cable for terrestrial networks.

The optical cable 5 comprises an optical core 500 and a sheath 501 surrounding the optical core 500.

The optical core 500 comprises eight optical units 510, each optical unit 510 comprising a respective buffer tube 502 and a respective number of optical fibers 503 loosely arranged within the buffer tube 502. The number of optical fibers 503 for each unit 510 preferably ranges from 2 to 12.

By way of non limiting example, in the cable shown in FIG. 5 each unit 510 comprises 12 optical fibers 503, the fiber count being equal to 96. One or more optical units 510 may be replaced by corresponding fillers, if a lower fiber count is requested. The optical fibers 503 are preferably single mode fibers compliant with ITU-T G652 standard. Each buffer tube 502 is preferably made of a thermoplastic polymeric material, for instance PBT (polybutylene terephthalate). In each optical unit 510, the interstices between the optical fibers 503 are preferably filled with a water-blocking material, e.g. a thixotropic gel. Furthermore, the free spaces between sheath 501 and optical units 510 are preferably filled with water blocking elements 504.

The optical core 500 also preferably comprises a central non-metallic strength member 507. The optical units 510 are preferably stranded around the strength member 507 according to an S-Z configuration.

The sheath 501 preferably has a structure similar to that of cable 1 shown in FIG. 1, namely: it comprises two diametrically opposed first longitudinally extending portions 505 made of a first, higher fracture toughness material and two diametrically opposed second longitudinally extending portions 506 made of a second, lower fracture toughness material, each one of the first portions 505 and second portions 506 having a transversal cross-section in the shape of a sector of annulus.

The geometrical features of the first and second portions 505, 506, as well as the features of the first and second materials, are the same as described above with reference to the first embodiment. Hence, a detailed description will not be repeated.

The cable 5 also comprises two optional ripcords 508 underneath the second sheath portions 506 made of the second, lower fracture toughness material.

Removal of the sheath 5 from the cable 5 is similar to the removal operation of the sheath 101 from the cable 1 shown in FIG. 1 as described above. Therefore, a detailed description will not be repeated.

Upon removal of a length of the sheath 501 in a "banana peel fashion" as described above, a portion of optical core 500 having substantially the same length as the length of removed sheath is exposed. In particular, the optical units 510 are exposed. The operator may then peel one or more optical units 510 by removing its buffer tube 502 (e.g. by a tool), thereby exposing the optical fibers 503 comprised therein. The operator may then carry out splicing and other installation operations on the optical fibers 503.

This fifth embodiment then exhibits the same advantages as the first one: the sheath may be removed in a very easy and very safe way and no grooves are needed on the external surface of the sheath, the sheath being thereby thin and mechanical stable at the same time.

Figure 6:
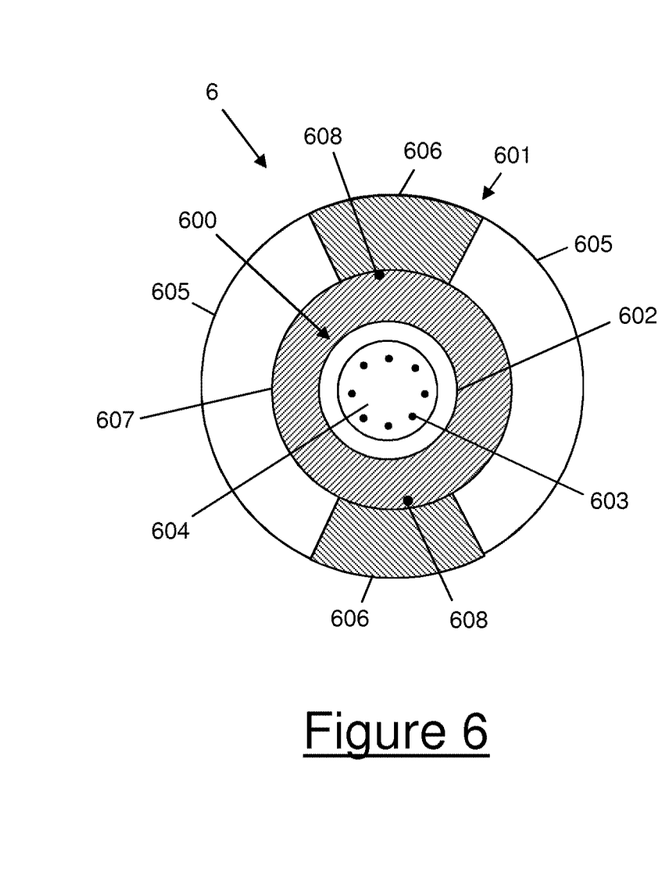
FIG. 6 is a cross-section view of an optical cable according to a sixth embodiment of the present invention.

FIG. 6 shows an optical cable 6 according to a sixth embodiment of the present invention. The optical cable 6 according to the sixth embodiment of the present invention is a central-loose tube cable for terrestrial networks.

The optical cable 6 comprises an optical core 600 and a sheath 601 surrounding the optical core 600.

The optical core 600 comprises a buffer tube 602 and a number of optical fibers 603 loosely arranged within the buffer tube 602. By way of non limiting example, in the cable shown in FIG. 6 the optical core 600 comprises 8 optical fibers 603. The buffer tube 602 is preferably made of a thermoplastic polymeric material, for instance PBT (polybutylene terephthalate). The optical fibers 603 are preferably single mode fibers compliant with ITU-T G652 standard. The interstices between the optical fibers 603 are preferably filled with a water-blocking material 604, e.g. a thixotropic gel.

The cable 6 also comprises a strength member 607 between the optical core 600 and the sheath 601. The strength member 607 preferably is a layer of glass yarns.

The sheath 601 preferably has a structure similar to that of cable 1 shown in FIG. 1, namely: it comprises two diametrically opposed first longitudinally extending portions 605 made of a first, higher fracture toughness material and two diametrically opposed second longitudinally extending portions 606 made of a second, lower fracture toughness material, each one of the first portions 605 and second portions 606 having a transversal cross-section in the shape of a sector of annulus. The geometrical features of the first and second portions 605, 606, as well as the features of the first and second materials, are the same as described above with reference to the first embodiment. Hence, a detailed description will not be repeated.

The cable 6 also comprises two optional ripcords 608 underneath the second sheath portions 606 made of the second, lower fracture toughness material. Each ripcord 608 is preferably embedded within the glass yarns 607.

Removal of the sheath 601 from the cable 6 is similar to the removal operation of the sheath 101 from the cable 1 shown in FIG. 1 as described above. Therefore, a detailed description will not be repeated.

Upon removal of a length of the sheath 601 in a "banana peel fashion" as described above, a portion of optical core 600 and glass yarns 607 having substantially the same length as the length of removed sheath are accordingly exposed. The operator may then cut the excess length of the glass yarns 607 (e.g. by means of scissors) and remove the buffer tube 602 with a suitable cutter, thereby exposing the optical fibers 603 comprised therein. The operator may then carry out splicing and other installation operations on the optical fibers 603.

This sixth embodiment then exhibits the same advantages as the first one: the sheath may be removed in a very easy and very safe way and no grooves are needed on the external surface of the sheath, the sheath being thin and mechanical stable at the same time.

In both cables 5 and 6 shown in FIGS. 5 and 6, the sheaths 501 and 601 may have the structure shown in FIGS. 2 and 4, namely in the sheaths 501 and 601 the first and second materials with different fracture toughness are arranged in concentric layer, the innermost layer of lower fracture toughness material being accessible from outside the cable through two diametrically opposed grooves or notches provided in the outermost layer of higher fracture toughness material.

Furthermore, although in all the above described embodiments the lower fracture toughness material is accessible from outside the optical cable along two diametrically opposed longitudinally extending areas, this is not limiting.

According to variants not shown in the drawings, the lower fracture toughness material is accessible from outside the optical cable along two longitudinally extending areas which are not diametrically opposed. In particular, according to such variants, in the sheath structure shown in FIGS. 1, 3, 5 and 6 the two second portions 106, 306, 506 or 606 are spaced apart by an angle different from 180°. Besides, according to such variants, in the sheath structure shown in FIGS. 2 and 4 the two grooves 209 or 409 are spaced apart by an angle different from 180°.

In such cases, the cuts which longitudinally propagate along the sheath during the removal operation divide the sheath in two non-symmetric parts, namely a larger part (including a larger portion 105, 205, 305, 405, 505 or 605 of higher fracture toughness material) and a narrower part (including a narrower portion 105, 205, 305, 405, 505 or 605 of higher fracture toughness material). The advantages set for above are however preserved.

According to other variants not shown in the drawings, the lower fracture toughness material is accessible from outside the optical cable along a single longitudinally extending area. In particular, according to such variants, in the sheath structure shown in FIGS. 1, 3, 5 and 6 a single second portion 106, 306, 506 or 606 is provided. Besides, according to such variants, in the sheath structure shown in FIGS. 2 and 4 a single groove 209 or 409 is provided.

In such cases, a single cut is longitudinally propagated along the sheath e.g. by inserting a finger into the cut and sliding it along the sheath in the longitudinal direction. The advantages set for above are however preserved.

Although in the above description reference have been made only to loose-tube cables, it an be appreciated that the sheath structures described above may be applied to optical cables with other types of optical cores (ribbon, tight-buffered, etc.).

The invention claimed is:

1. An optical cable comprising an optical core and an external sheath surrounding said optical core,
    wherein said external sheath comprises a first material having a first fracture toughness $K_{IC}$ and a second material having a second fracture toughness $K_{IC}$, wherein the first fracture toughness $K_{IC}$ is greater than the second fracture toughness $K_{IC}$, wherein said first material and said second material are arranged so that said second fracture toughness material is accessible from outside said cable along at least one longitudinally extending area of an outer surface of said sheath and that at least one portion of said second fracture toughness material accessible from outside said cable extends substantially through a whole thickness of said sheath, wherein said first material and said second material are selected so that a ratio between said fracture toughness $K_{IC}$ of said first material and said fracture toughness $K_{IC}$ of said second material is between 1.2 and 7.5,
    wherein said at least one portion of said second fracture toughness material has an annular cross-section, wherein said first fracture toughness material is arranged in an outermost position so as to substantially surround said second fracture toughness material, and wherein said sheath comprises at least one groove suitable for making said second fracture toughness material accessible from outside said cable along said longitudinally extending area of said outer surface of said sheath.

2. The optical cable according to claim 1, wherein said second fracture toughness material is accessible from outside said cable along two longitudinally extending areas of said outer surface of said sheath.

3. The optical cable according to claim 2, wherein said two longitudinally extending areas of said outer surface of said sheath are arranged at diametrically opposed positions.

4. The optical cable according to claim 1, wherein said at least one portion of said second fracture toughness material has a transversal cross-section in a shape of a sector of annulus.

5. The optical cable according to claim 4, wherein said at least one portion of said second fracture toughness material has an angular width lower than 90°.

6. The optical cable according to claim 4, wherein said sheath has a substantially uniform thickness.

7. The optical cable according to claim 6, wherein said sheath has a thickness between 0.3 mm and 2.1 mm.

8. The optical cable according to claim 1, wherein said sheath comprises two grooves suitable for making said second fracture toughness material accessible from outside said cable along two longitudinally extending areas of said outer surface of said sheath.

9. The optical cable according to claim 1, wherein said first material and said second material have substantially a same hardness.

10. The optical cable according to claim 1, wherein said first material and said second material comprise a same compound.

11. The optical cable according to claim 1, wherein said first material and said second material have different colours.

12. A process for manufacturing an optical cable comprising:
    providing an optical core; and
    forming an external sheath surrounding said optical core, wherein said external sheath comprises a first material having a first fracture toughness $K_{IC}$ and a second material having a second fracture toughness $K_{IC}$,
    wherein the first fracture toughness $K_{IC}$ is greater than the second fracture toughness $K_{IC}$, wherein said first material and said second material are arranged so that said second fracture toughness material is accessible from outside said cable along at least one longitudinally extending area of an outer surface of said sheath and that at least one portion of said second fracture toughness material accessible from outside said cable extends substantially through a whole thickness of said sheath, and wherein said first material and said second material are selected so that a ratio between said fracture toughness $K_{IC}$ of said first material and said fracture toughness $K_{IC}$ of said second material is between 1.2 and 7.5,
    wherein said at least one portion of said second fracture toughness material has an annular cross-section, wherein said first fracture toughness material is arranged in an outermost position so as to substantially surround said second fracture toughness material, and wherein said sheath comprises at least one groove suitable for making said second fracture toughness material accessible from outside said cable along said longitudinally extending area of said outer surface of said sheath.

13. The optical cable according to claim 1, further comprising two ripcords arranged between said optical core and said second material of said external sheath, wherein each of said ripcords comprises non-metallic yarn.

14. The process for manufacturing an optical cable according to claim 12, further comprising providing two ripcords arranged between said optical core and said second material of said external sheath, wherein each of said ripcords comprises non-metallic yarn.

* * * * *